H. SIEBEN.
GEARING.
APPLICATION FILED JUNE 4, 1921.

1,423,037.

Patented July 18, 1922.

INVENTOR
Henry Sieben.
BY
ATTORNEY

H. SIEBEN.
GEARING.
APPLICATION FILED JUNE 4, 1921.
1,423,037.
Patented July 18, 1922.
2 SHEETS—SHEET 2.
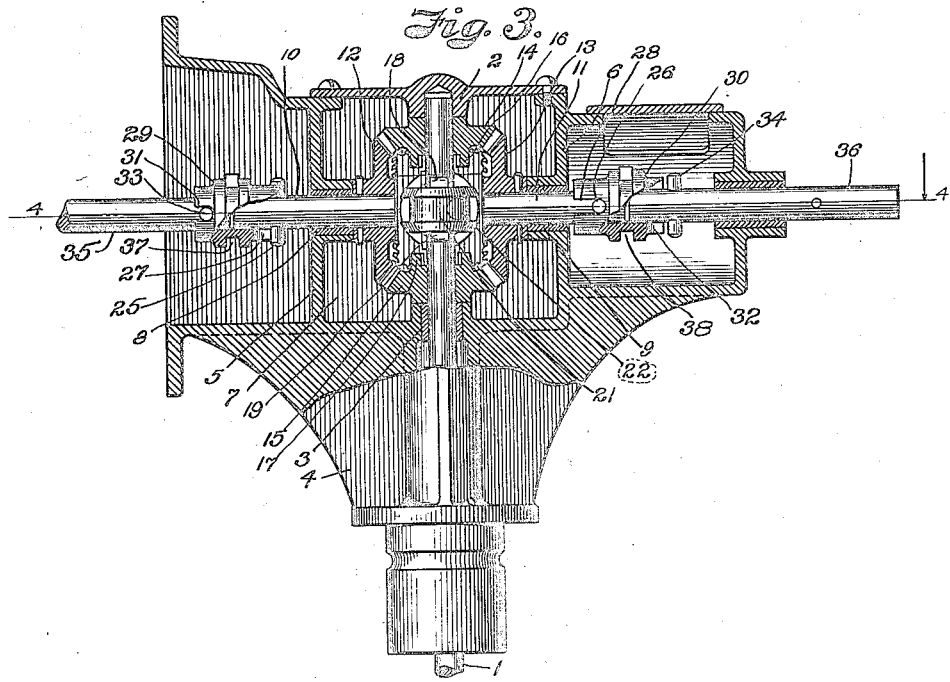
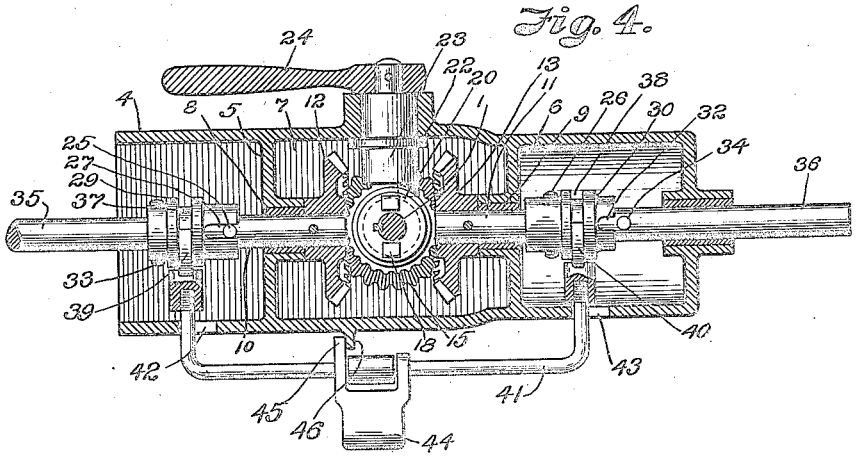
INVENTOR
Henry Sieben.
BY
ATTORNEY

UNITED STATES PATENT OFFICE.

HENRY SIEBEN, OF KANSAS CITY, MISSOURI.

GEARING.

1,423,037. Specification of Letters Patent. Patented July 18, 1922.

Application filed June 4, 1921. Serial No. 474,918.

*To all whom it may concern:*

Be it known that I, HENRY SIEBEN, a citizen of the United States, residing at Kansas City, in the county of Jackson and State of Missouri, have invented certain new and useful Improvements in Gearing; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to gearing and particularly to a gearing whereby a drive shaft may drive two oppositely located, aligning shafts in reversed direction through intermeshing gears, which may be normally out of clutch engagement or driving engagement with the shaft but which may be caused to receive motion therefrom through the medium of certain clutch mechanisms associated therewith.

The invention is particularly applicable for use in connection with washing machines in which the power shaft of the washing machine may transmit motion to a wringer shaft or to a mangle shaft, the wringer and mangle shafts being adapted to be operated reversibly upon the shifting of a clutch and said shafts are adapted to be alternately driven so that when one is operated, the other is stationary and vice versa.

The novel arrangement of the gearing is illustrated in the accompanying drawings, in which—

Fig. 3 is a vertical, longitudinal, sectional view through the gearing, the shafts and clutches being shown in elevation, and Fig. 4 is a sectional view on the line 4—4 of Fig. 3.

Figure 1:
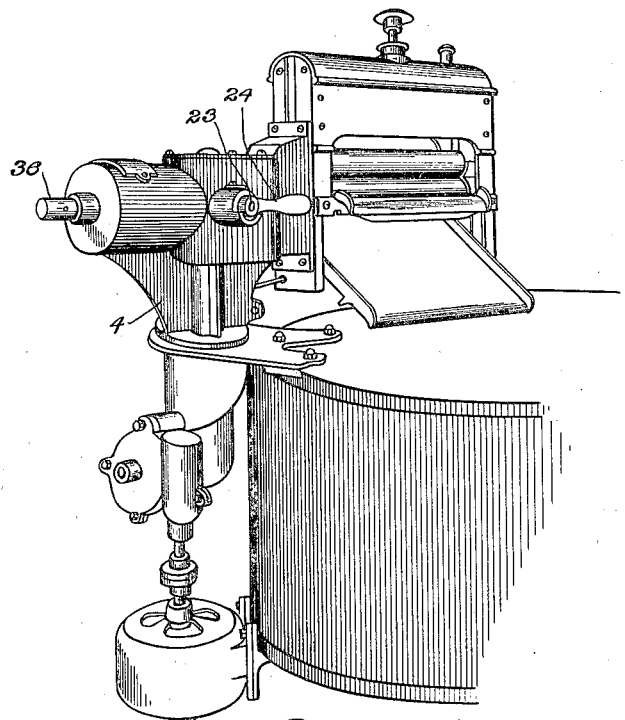
Fig. 1 is a perspective view of the driving mechanism of a washing machine to which my invention is applied.
Figure 2:
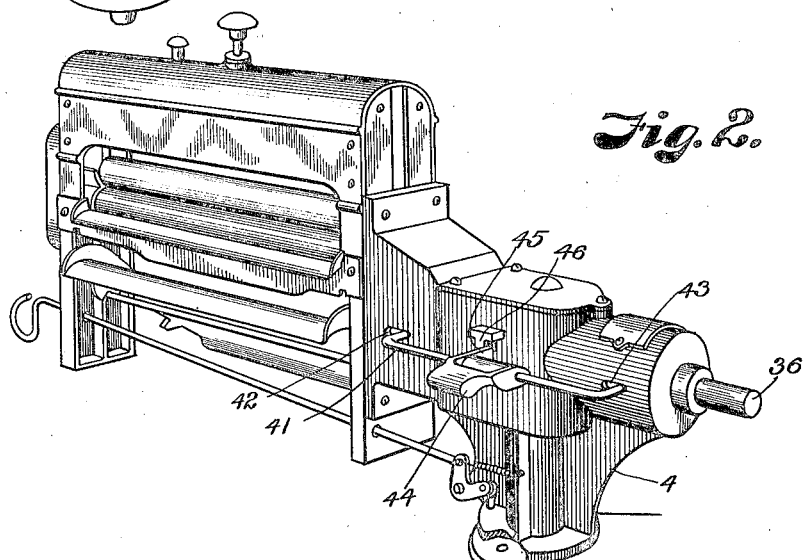
Fig. 2 is a perspective view of the washing machine driving mechanism particularly illustrating a clutch actuator.

The drive shaft 1 may receive its motion from any suitable means and it is mounted in bearings, 2 and 3 in a casting 4, which is provided with a box-like chamber in which is located the intermeshing gears which receive motion from the shaft 1. The end walls 5 and 6 of the chamber 7 carried by the casting 4 are provided with shaft bearings 8 and 9, in which the aligning gear-carrying shafts 10 and 11 are mounted.

Connected to the inner end of the shaft 10 is a gear 12, having spaced from but opposite to it, a complementary gear 13 on the shaft 11. The gears 12 and 13 mesh with the gears 14 and 15 respectively on the shaft 1, the gear 14 being above the gear 15 and diametrically opposite it with its axis at right angles to the axis of the gears 12 and 13 so that a box-like gearing is formed with the teeth of the respective gears meshing so that a continuous train of gears is provided.

The gears 14 and 15 are provided with clutch faces 16 and 17 adapted to be engaged by the clutch faces 18 and 19 on the longitudinally slidable clutch member 20 within the space formed by the gears, the clutch having a circumferential groove 21 to be engaged by the eccentric finger 22 on the clutch actuator shaft 23 provided exteriorly of the housing or chamber 7 with an operating handle 24. Therefore, when the clutch member is shifted in an upward direction so that it engages with the clutch face 16, the shaft 1 will drive the gear 14, communicating motion to the gears 12 and 13 in opposite directions, the gear 15 at this time rotating idly on the shaft 1. When the clutch is shifted in an opposite direction so that it engages with the clutch face of the gear 15, the shaft 1 will drive the gear 15 directly and through it, the gears 12 and 13, the gear 14 at this time rotating idly on the shaft 1.

The shafts 10 and 11 are provided with pins 25 and 26 which receive the slotted portions 27 and 28 of the clutch sleeves 29 and 30. The clutch sleeves are also provided with slots or notches 31 and 32 respectively to engage the pins 33 and 34 on the driven shafts 35 and 36 in line with the shafts 10 and 11. The sleeves 29 and 30 are provided with circumferential grooves 37 and 38 to receive the forked portions 39 and 40 of the yoke-shaped actuator 41, which projects through the slots 42 and 43 in the side of the case and which is provided with a latch member 44 pivoted on the connecting bar of the U-shaped member and having a finger 45 which is adapted to engage on the respective sides of the stop 46 carried by the casting 4.

It is obvious that if the clutch member 20 is in neutral position, the shaft 1 will rotate without imparting motion to any of the gears. When, however, the clutch member 20 is shifted to engage either the gear 14 or the gear 15, both the gears 12 and 13 will be rotated. If the clutch actuator 41 is shifted to the left, shifting the sleeves 29 and 30 to the left, the shaft 35 will be driven but the shaft 36 will be out of clutch engagement with its complementary aligning shaft 11. The finger 45, when the clutches are in this position, may assume the position on the left side of the stop 46 so that the clutch will be held in proper cooperative relation. When it is desired to shift the power to the shaft 36, the member 45 will be swung on the yoke 41 to move out of engagement with the stop 46 so that the clutch yoke 41 can be shifted to the right, releasing the sleeve 29 from engagement with the pin 33 and causing the sleeve 30 to engage the pin 34 on the shaft 36 so that the shaft 36 will be rotated.

If the clutch member 20 is caused to engage the gear 14, the driven shaft will be operated in one direction and if the clutch member is caused to engage the gear 15, the driven shaft will be operated in a different direction.

It will be apparent that the power can be conveniently communicated from the drive shaft to the driven shaft through the intermediate gears so that the selected drive shaft will operate in either direction and the gears and clutches are so arranged that either driven shaft may have power communicated to it to the exclusion of the other shaft to be driven.

The arrangement of gearing above described particularly lends itself for use in connection with washing machines in which a wringer may be driven by one shaft and a mangle by the other.

What I claim and desire to secure by Letters-Patent is:

1. A gearing comprising a drive shaft, spaced gears loosely mounted on the drive shaft and having clutch faces, a clutch member intermediate the gears and having clutch faces on its respective ends to alternately engage the clutch faces on the gears, mating gears at right angles to the first named gears and meshing therewith, stub shafts fixed to the last mentioned gears, aligning shafts for the stub shafts, and sleeved clutch members for connecting the aligning shafts to the stub shafts.

2. A gearing comprising a drive shaft, spaced gears loosely mounted on the drive shaft and having clutch faces, a clutch member intermediate the gears and having clutch faces on its respective ends to alternately engage the clutch faces on the gears, mating gears at right angles to the first named gears and meshing therewith, stub shafts fixed to the last mentioned gears, aligning shafts for the stub shafts, sleeved clutch members, and means for simultaneously actuating the clutch members to connect one aligning shaft to its stub shaft and disconnect the other aligning shaft from its stub shaft.

3. A gearing comprising a drive shaft, gears loosely mounted on the drive shaft, means for alternately clutching the gears to the drive shaft, mating driven gears meshing with the first named gears, oppositely disposed shafts in axial alignment with and adapted to be driven by the driven gears, and connected clutch members for alternately clutching one aligning shaft into driving engagement with a driven gear and releasing the other aligning shaft from engagement with a driven gear.

4. In a gearing, a drive shaft, gears loosely mounted on the drive shaft and having clutch faces, a clutch member intermediate the gears and movable to alternately clutch the respective gears to the drive shaft, mating gears in constant mesh with the first named gears, stub shafts driven by the mating gears, supplemental shafts in line with the stub shafts, clutch members sleeved on the stub shafts and the aligning shafts, a yoke connected to said clutch members for moving one clutch member into clutching position and the other out of clutching position, a pivoted latch on the yoke for holding it against movement, and an abutment for engagement with the latch.

In testimony whereof I affix my signature.

HENRY SIEBEN.